(12) United States Patent
Kissee et al.

(10) Patent No.: US 7,731,010 B2
(45) Date of Patent: Jun. 8, 2010

(54) ARTICLE-ROTATING BELT CONVEYOR

(75) Inventors: Darrell E. Kissee, Kenner, LA (US); Timothy J. Hicks, Ponchatoula, LA (US)

(73) Assignee: Laitram, L.L.C., Harahan, LA (US)

( * ) Notice: Subject to any disclaimer, the term of this patent is extended or adjusted under 35 U.S.C. 154(b) by 8 days.

(21) Appl. No.: 12/301,271

(22) PCT Filed: Jun. 4, 2007

(86) PCT No.: PCT/US2007/070307

§ 371 (c)(1),
(2), (4) Date: Nov. 18, 2008

(87) PCT Pub. No.: WO2007/146633

PCT Pub. Date: Dec. 21, 2007

(65) Prior Publication Data

US 2009/0200139 A1 Aug. 13, 2009

Related U.S. Application Data

(60) Provisional application No. 60/804,844, filed on Jun. 15, 2006.

(51) Int. Cl.
*B65G 47/10* (2006.01)
(52) U.S. Cl. ............... 198/370.09; 198/457.02; 198/411
(58) Field of Classification Search ........... 198/370.09, 198/457.02, 411, 413, 779
See application file for complete search history.

(56) References Cited

U.S. PATENT DOCUMENTS

| | | | |
|---|---|---|---|
| 3,973,672 A | 8/1976 | Frost | |
| 4,143,756 A | 3/1979 | Chorlton | |
| 4,541,768 A | 9/1985 | Walker et al. | |
| 4,676,361 A | 6/1987 | Heisler | |
| 4,901,842 A | 2/1990 | Lemboke et al. | |
| 5,092,447 A | 3/1992 | Wyman | |
| 5,145,049 A | 9/1992 | McClurkin | |
| 5,191,962 A | 3/1993 | Wegscheider et al. | |
| 5,293,984 A | 3/1994 | Lucas | |
| 5,400,896 A | 3/1995 | Loomer | |
| 6,401,936 B1 | 6/2002 | Isaacs et al. | |
| 6,494,312 B2 | 12/2002 | Costanzo | |
| 6,571,937 B1 * | 6/2003 | Costanzo et al. | ............ 198/779 |
| 6,758,323 B2 * | 7/2004 | Costanzo | ............... 198/457.02 |
| 6,923,309 B2 | 8/2005 | Costanzo | |

(Continued)

FOREIGN PATENT DOCUMENTS

WO 2007085825 A1 8/2007

*Primary Examiner*—James R Bidwell
(74) *Attorney, Agent, or Firm*—James T. Cronvich

(57) ABSTRACT

A conveyor (20) comprising at least one belt (22) defining an outer conveying surface divided into at least two laterally offset regions in which the rollers (50) in one region rotate in a first direction and the rollers (51) in a second region rotate in a second direction as the conveyor belt (22) advances in a conveying direction. The rollers (50, 51) rotate by rolling along roller-engagement surfaces (54) underlying the conveyor belt along a carryway. The rollers rotating in the first direction rotate with a velocity component in the conveying direction (32) different from the velocity component in the conveying direction of the rollers rotating in the second direction. An article positioned simultaneously atop rollers in both regions is rotated by the rotation of the rollers as the conveyor belt advances.

19 Claims, 9 Drawing Sheets

U.S. PATENT DOCUMENTS

| | | |
|---|---|---|
| 6,968,941 B2 | 11/2005 | Fourney |
| 7,007,792 B1 | 3/2006 | Burch |
| 7,097,029 B2 | 8/2006 | Halang |
| 7,111,722 B2 | 9/2006 | Burch |
| 7,249,669 B2 * | 7/2007 | Fourney ................ 198/370.09 |
| 7,389,867 B2 | 6/2008 | Hillmantel et al. |
| 2007/0205083 A1 | 9/2007 | Smalley et al. |

* cited by examiner

ARTICLE-ROTATING BELT CONVEYOR

BACKGROUND

This invention relates generally to power-driven conveyors and, more particularly, to conveyors capable of rotating and translating conveyed articles conveyed atop conveyor belts having article-diverting rollers that rotate about differently oriented axes as the conveyor belt advances.

Many conveying applications require that conveyed articles of a variety of shapes and sizes be aligned in a specific orientation for downstream processing or inspection. Sometimes the width of the conveyor or of the entrance into a processing station is limited. In the case of articles having a generally rectangular footprint, with a minor axis and a longer major axis, the major axis or the diagonal can exceed the dimensions of a limited-width portion of the conveyor. If the major axis of an oversized article is oriented on the conveyor with its long axis across the width of the conveyor, the article can jam between the side walls of the conveyor. Manual intervention is then required to free the jam. Consequently, there is a need for a conveyor that can align and orient articles of a variety of sizes and shapes.

SUMMARY

This need and other needs are satisfied by a conveyor embodying features of the invention. One version of the conveyor comprises a carryway that extends longitudinally in a conveying direction from an upstream end to a downstream end and laterally in width from a first side edge to a second side edge. At least one conveyor belt advances along the carryway in the conveying direction and forms an outer conveying surface. The conveyor belt includes rollers that extend upward through the thickness of the conveyor belt into supporting contact with conveyed articles along the carryway. The outer conveying surface is divided into at least two regions: a first region nearer the first side edge and a laterally offset second region nearer the second side edge. The rollers in the first region are oriented to rotate in a first direction, and the rollers in the second region are oriented to rotate in a second direction. Roller control means cause the rollers in the first region to rotate at a first velocity and the rollers in the second region to rotate at a second velocity so that the component of the first velocity in the conveying direction is different from the component of the second velocity in the conveying direction.

In another aspect of the invention, a conveyor comprises a carryway extending longitudinally in a conveying direction from an upstream end to a downstream end and laterally in width from a first side edge to a second side edge. At least one conveyor belt advances along the carryway in the conveying direction and forms an outer conveying surface divided into a first region and a laterally offset second region. First rollers in the first region extend through the thickness of the conveyor belt and rotate on parallel first axes generally perpendicular to the conveying direction. Second rollers in the second region extend through the thickness of the conveyor belt and rotate on parallel second axes oblique to the first axes. Roller-engagement surfaces lie under the conveyor belt along the carryway in contact with the first and second rollers. The contact causes the first and second rollers to rotate as the conveyor belt advances in the conveying direction. The first rollers rotate with a velocity component in the conveying direction different from the velocity component in the conveying direction of the second rollers as the at least one conveyor belt advances along the carryway.

In another aspect of the invention, a method for rotating an article conveyed atop a belt conveyor comprises: (a) advancing at least one conveyor belt in a conveying direction, in which the conveyor belt has an upper conveying surface that is divided into laterally offset first and second regions with first rollers in the first region extending through the thickness of the conveyor belt and arranged to rotate in a first direction and second rollers in the second region extending through the thickness of the conveyor belt and arranged to rotate in a second direction; and (b) rotating the first rollers in the first direction with a first velocity component in the conveying direction and the second rollers in the second direction with a different second velocity component in the conveying direction to cause an article simultaneously in the first and second regions atop first and second rollers to rotate on the upper conveying surface.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
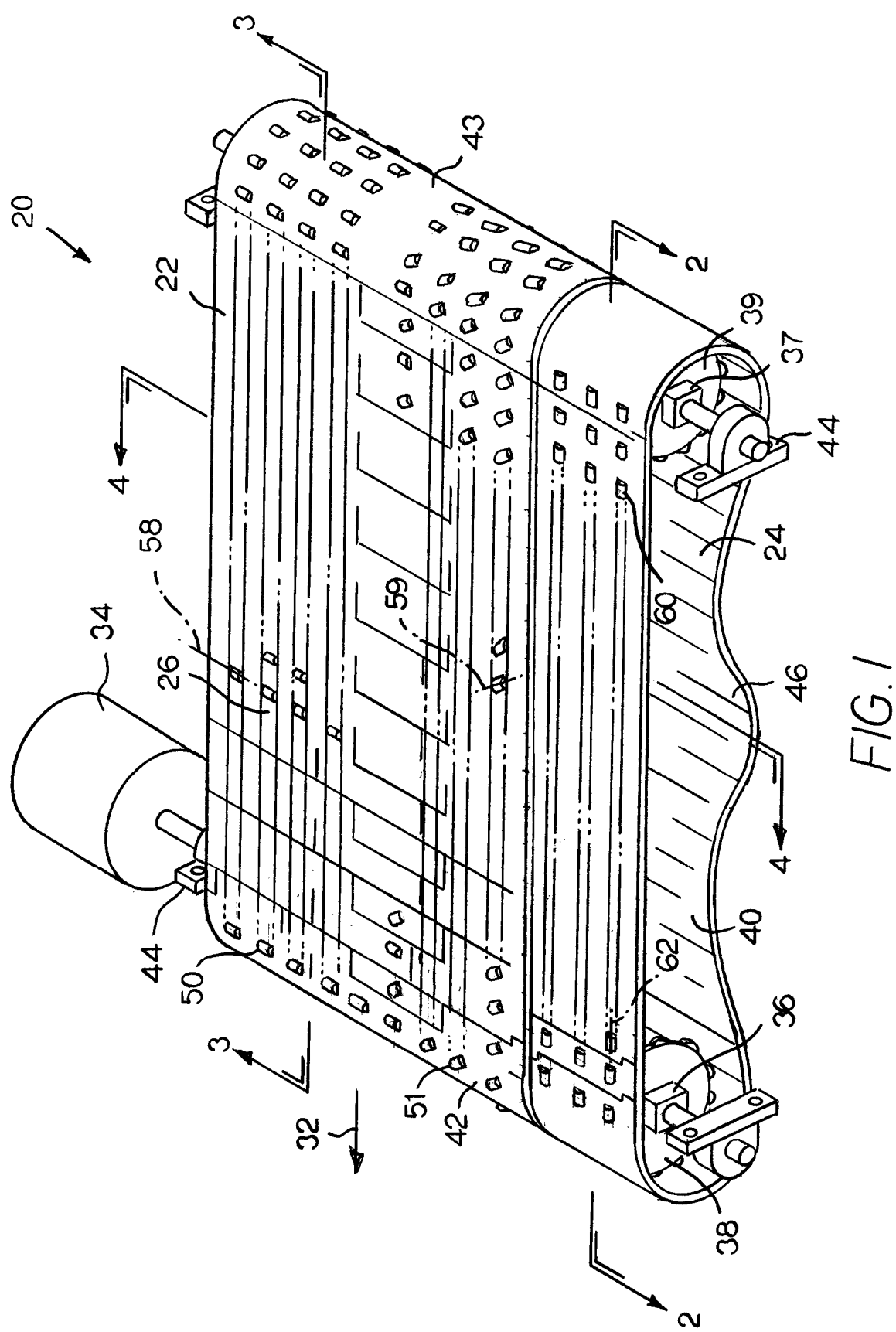
FIG. 1 is a pictorial view of a conveyor embodying features of the invention for rotating and translating articles across the conveyor.
Figure 2:
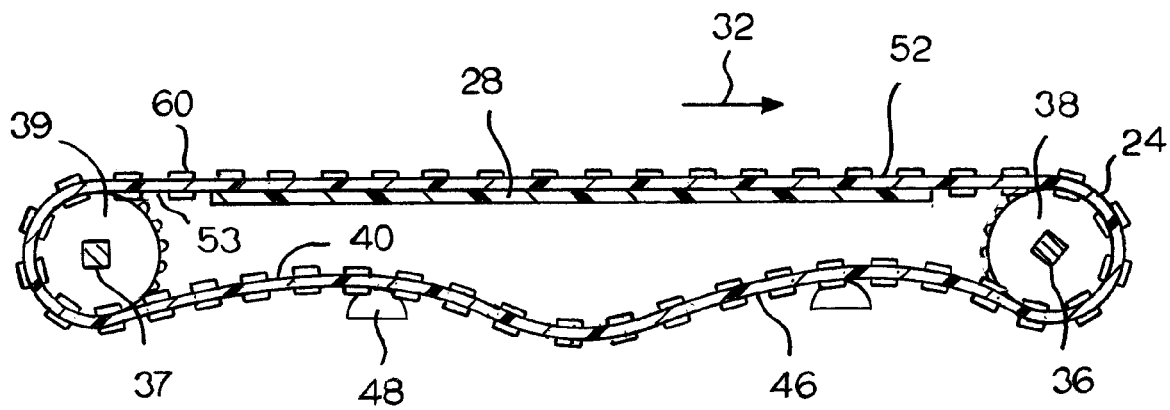
FIG. 2 is a cross section of the conveyor of FIG. 1 taken along lines 2-2.
Figure 3:
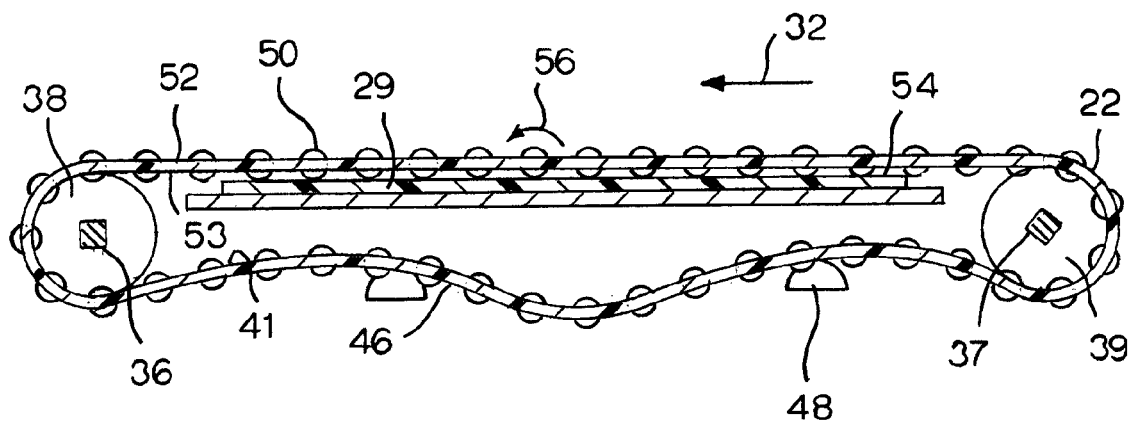
FIG. 3 is a cross section of the conveyor of FIG. 1 taken along lines 3-3.

One version of a conveyor for rotating conveyed articles and embodying features of the invention is shown in FIGS. 1-4. The conveyor 20 includes a first endless conveyor belt 22 parallel to and abutting a second endless conveyor belt 24. Together the belts define an upper conveying surface 26 along which articles are conveyed. The upper conveying surface of the belts is supported on a carryway that includes support members, such as wearstrips 28, 29 or support rollers 30 (FIG. 5). The conveyor belts are driven in a conveying direction 32 by a drive including a motor 34 coupled to a drive shaft 36. Sprockets 38 mounted on the drive shaft engage drive surfaces on the inner sides 40, 41 of the belts at a downstream end 42 of the carryway. The belts are trained between the drive sprockets 38 and idle sprocket 39 at an upstream end 43 of the carryway. The idle sprockets are mounted on an idle shaft 37. Both shafts are supported for rotation in bearing blocks 44 at each end, which are mounted in a conveyor frame (not shown). The belts are supported and their sag is reduced along a lower returnway 46 by rollers or shoes 48.

The first conveyor belt 22 has two sets of rollers 50, 51 with diameters that exceed the thickness of the belt. Salient portions of the rollers extend past top and bottom sides 52, 53 of the belt. The salient portions of the rollers 50, 51 ride along roller-engagement bearing surfaces 54 formed by the flat top sides of the support members-wearstrips 29, in this example. The rollers engage the bearing surfaces as the belt advances and rotate in the direction indicated by the arrow 56 in FIG. 3. The rollers 50 in longitudinal region 47 at one side of the belt are arranged to rotate on lateral axes 58 (90° from the conveying direction). These rollers 50 are referred to as in-line rollers because they rotate in and push conveyed articles parallel to the main conveying direction, i.e., the direction of belt travel 32. The rollers 51 in a laterally offset region 49 nearer the other side of the belt 22 are arranged to rotate on axes 59 oblique to the conveying direction and to the axes of the in-line rollers. These rollers 51 are referred to as oblique rollers. As the belt advances, each roller applies a force to an article conveyed atop it in a direction perpendicular to the roller's axis. Thus, the in-line rollers 50 push the article in the conveying direction 32, and the oblique rollers 51 push the article obliquely toward the second belt 24.

The second belt 24 includes rollers 60 that are arranged to rotate on axes 62 parallel to the conveying direction 32. These rollers 60, which define a third region 63 on the outer conveying surface, are referred to as transverse rollers because they direct conveyed articles toward the side of the belt in a direction transverse to its advance. Unlike the in-line rollers 50 and the oblique rollers 51, the transverse rollers 60 do not contact a bearing surface along the carryway. The second belt is instead supported directly on the wearstrips 28 in longitudinal lanes 64 between the lanes of rollers. The transverse rollers are free to rotate on their axes by contact with laterally moving articles. Because the transverse rollers do not have to engage bearing surfaces, they do not have to extend past the bottom 53 of the belt.

Another version of bearing surface for the first belt 22 is shown, along with details of the belt, in FIG. 5. The oblique rollers 51 in the portion of the belt shown are mounted on axles 66 that extend through opposite walls of cavities 68 formed in modules 70 that are arranged in rows to form a modular conveyor belt. Hinge eyes 72, 73 on leading and trailing ends of each row are interleaved and connected by a hinge rod 74 received in the lateral passageway formed by the interleaved hinge eyes. The axles define the oblique axes 59 about which the rollers 51 rotate. The rollers are generally cylindrical with a peripheral tread 76 that may be plastic like the body of the roller or formed by a rubber band for a high-friction grip on bearing surfaces. The belt modules are preferably made of thermoplastic materials, such as polypropylene, polyethylene, acetal, or composite polymers, in an injection-molding process. The hinge rods may likewise be made of a suitable plastic material or stainless steel. The in-line rollers are mounted in similar cavities in the belt modules with axles oriented laterally. The second conveyor belt could be similarly constructed with the transverse rollers mounted in cavities on axles aligned parallel to the conveying direction.

Figure 4:
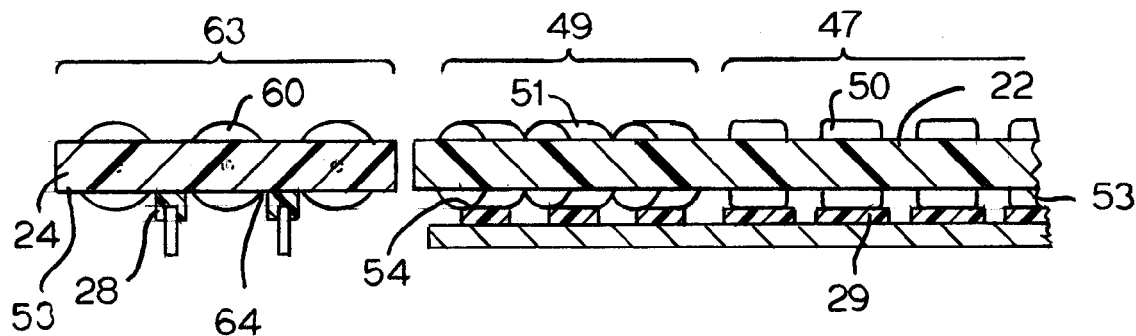
FIG. 4 is a cross section of the conveyor of FIG. 1 taken along lines 4-4 showing roller-engagement surfaces.
Figure 5:
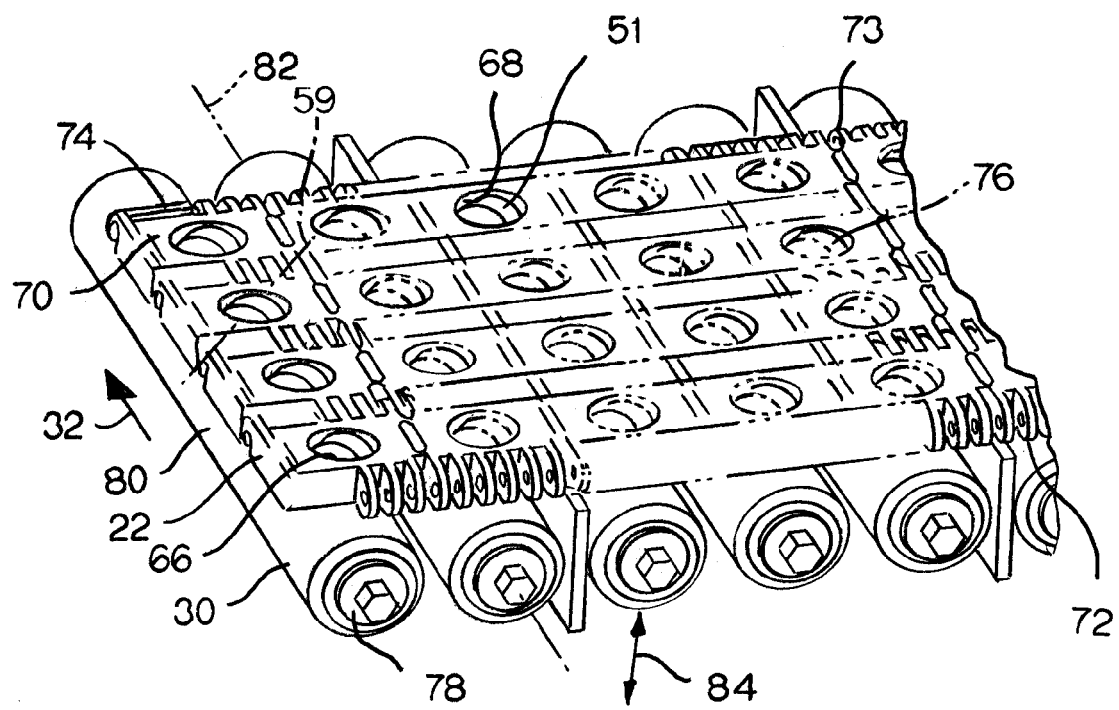
FIG. 5 is an axonometric view of a portion of a conveyor as in FIG. 1 with longitudinal rollers providing roller-engagement surfaces.

Instead of riding on flat-top wearstrips 29 as in FIG. 4, the oblique rollers could ride on longitudinal support rollers 78 whose cylindrical outer surfaces form roller-engagement bearing surfaces 80. Each support roller is positioned beneath a lane of oblique belt rollers. The support rollers rotate freely on axes 82 parallel to the conveying direction 32. As the conveyor belt advances, the belt rollers engage the longitudinal rollers in rolling contact. The rolling contact between the oblique belt rollers and the longitudinal rollers lessens the tendency of the oblique rollers to slide along the bearing surfaces. Although flat wearstrips may be acceptable for oblique rollers up to about 30° off in-line, the longitudinal rollers provide better bearing surfaces and less wear for oblique rollers at angles above about 45°. The longitudinal rollers 78 may be raised and lowered, as indicated by arrow 84, into and out of contact with the oblique rollers by pneumatic, hydraulic, or electrical mechanisms, for example.

Figure 6:
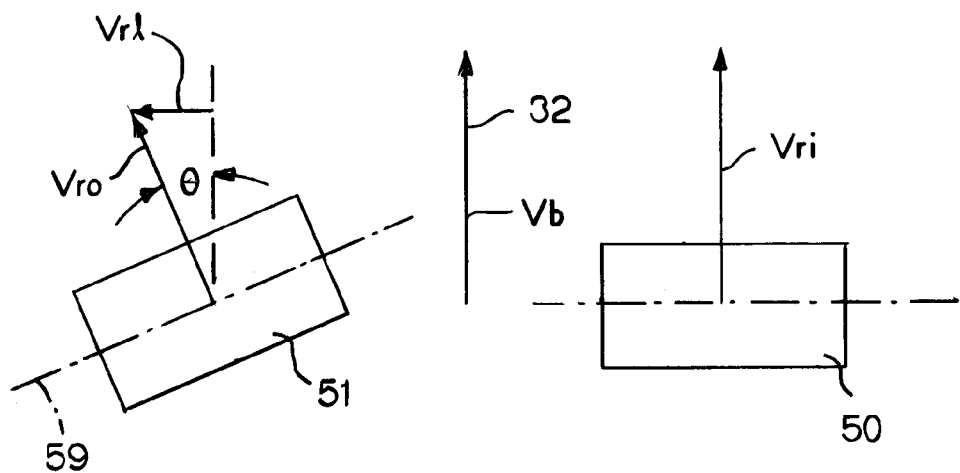
FIG. 6 is a vector diagram of the velocities of the article-supporting rollers of the conveyor of FIG. 1.

FIG. 6 is a vector diagram of the speeds of the in-line rollers 50 and oblique rollers 51 relative to the belt as it advances at a speed $v_b$ in the conveying direction 32. The tangential velocity of the in-line roller $v_{ri}$ relative to the belt, if there is no slip along the bearing surface, is equal to the belt speed $v_b$ in the conveying direction. (Superposing the in-line roller velocity on the advancing belt's velocity yields a net tangential roller velocity relative to a stationary observer of twice the belt velocity.) The tangential velocity $v_{ro}$ of the oblique roller relative to the belt for a no-slip condition is directed perpendicular to its axis 59 and can be shown to be $v_{ro}=v_b \sec \theta$, where $\theta$ is the angle of the roller from an in-line condition. The lateral component $v_{rl}$ of the oblique roller's velocity is equal to $v_b \tan \theta$. If the only difference between the in-line rollers and oblique rollers is their orientation relative to the conveying directions and both ride on flat wearstrips, the oblique rollers will slip more than the in-line rollers as the belt advances. The increased slip decreases the velocity of the oblique roller, including its component in the conveying direction. An article positioned simultaneously atop both in-line and oblique rollers is rotated on the conveying surface because of the roller speed differential in the conveying direction between the in-line and oblique rollers.

Figure 7A:
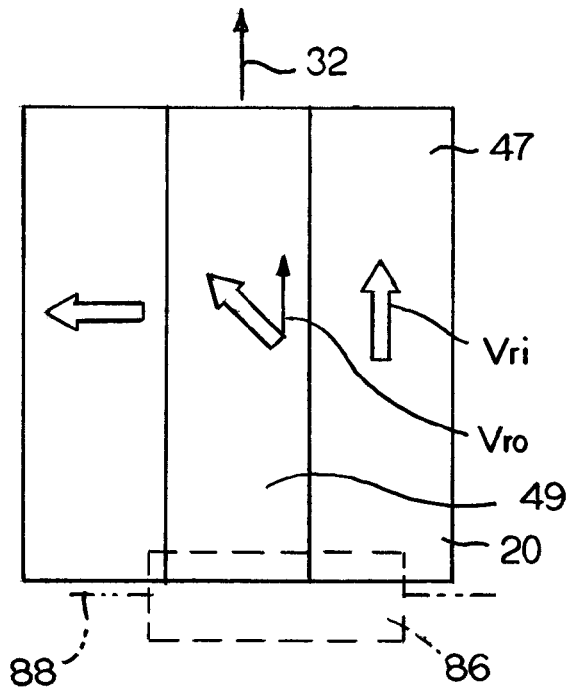
FIGS. 7A-7D are top plan diagrams illustrating the rotation and translation of articles conveyed by the conveyor of FIG. 1.
Figure 7B:
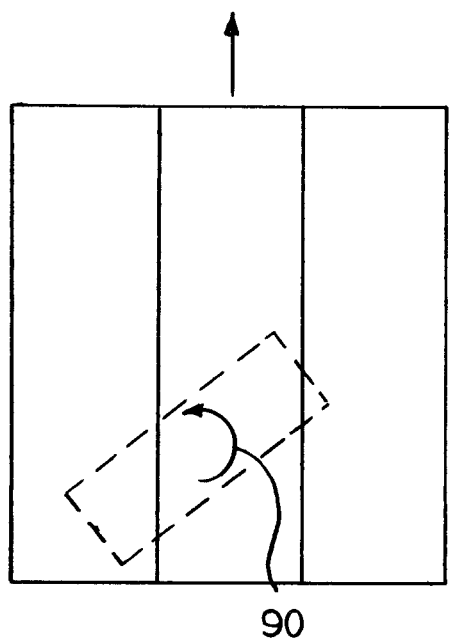
Figure 7C:
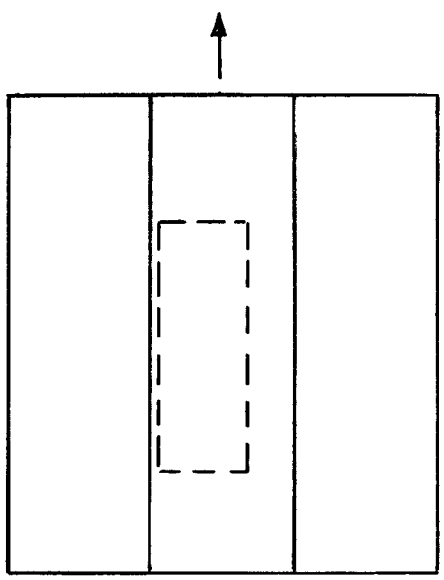
Figure 7D:
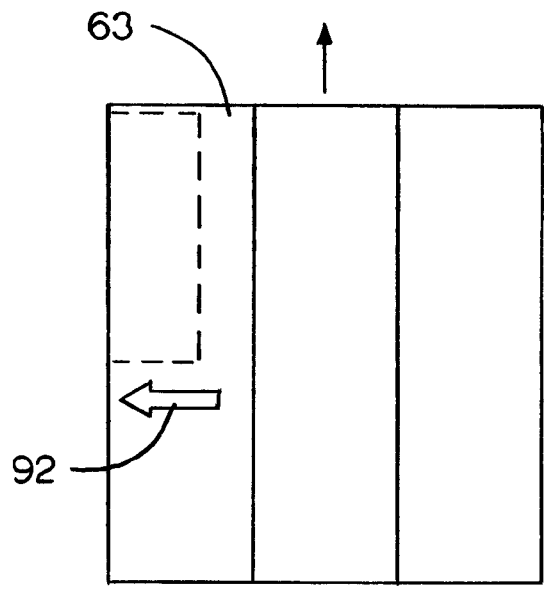

The operation of the conveyor of FIG. 1 is illustrated in FIGS. 7A-7D. An article 86 is fed onto the upstream end of the conveyor 20 in FIG. 7A. The major axis 88 of the article is at first laterally oriented in this example. With the slip of the oblique rollers in the second region 49 greater than the slip of the in-line rollers in the first region 47, the velocity component $v_{ri}$ of the in-line rollers in the conveying direction 32 is greater than the velocity component $v_{ro}$ of the oblique rollers in the conveying direction. This difference in forward velocities causes the article to rotate counterclockwise as indicated by the arrow 90 in FIG. 7B. In the meantime the lateral component of velocity of the rollers in the second region 49 pushes the article toward the left-hand side of the conveyor, as shown in FIG. 7C. The degree of rotation of a given article or a range of given articles can be set by selecting or adjusting parameters such as belt speed, region width, linear distance of engagement between belt rollers and bearing surfaces, and slip between belt rollers and engagement surfaces. The structure of a selected parameter or the means for adjusting it to cause the differential speeds of roller rotation constitute roll control means to rotate conveyed articles. In this example, the roll control means causes the article 86 to rotate about 90° in the time it takes to move across the conveying surfaces onto the third region 63 populated with freely rotatable transverse rollers. As shown in FIG. 7D, the article merely translates across the third region in the direction of arrow 92 by the momentum of the article pushed by the rollers in the second region.

Figure 9:
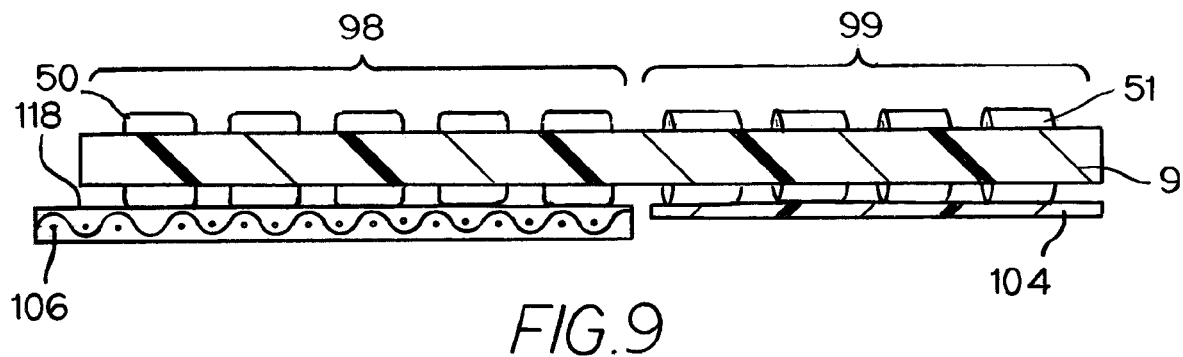
FIG. 9 is a cross sectional view of the conveyor of FIG. 8 taken along lines 9-9.
Figure 10:
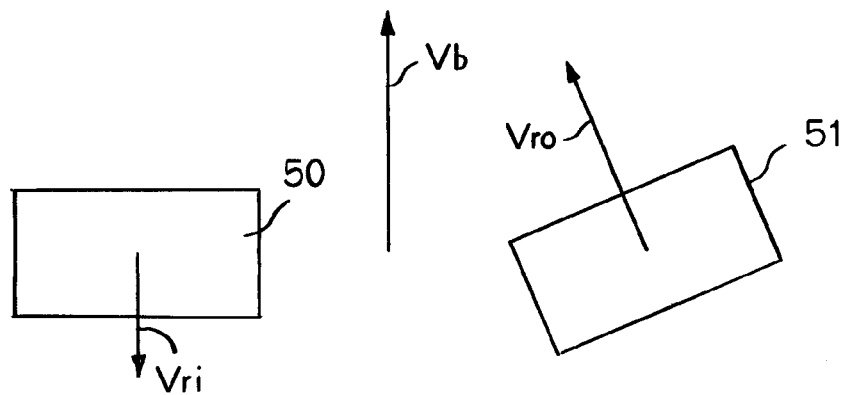
FIG. 10 is a vector diagram of the velocities of the rollers in the conveyor of FIG. 8.
Figure 8:
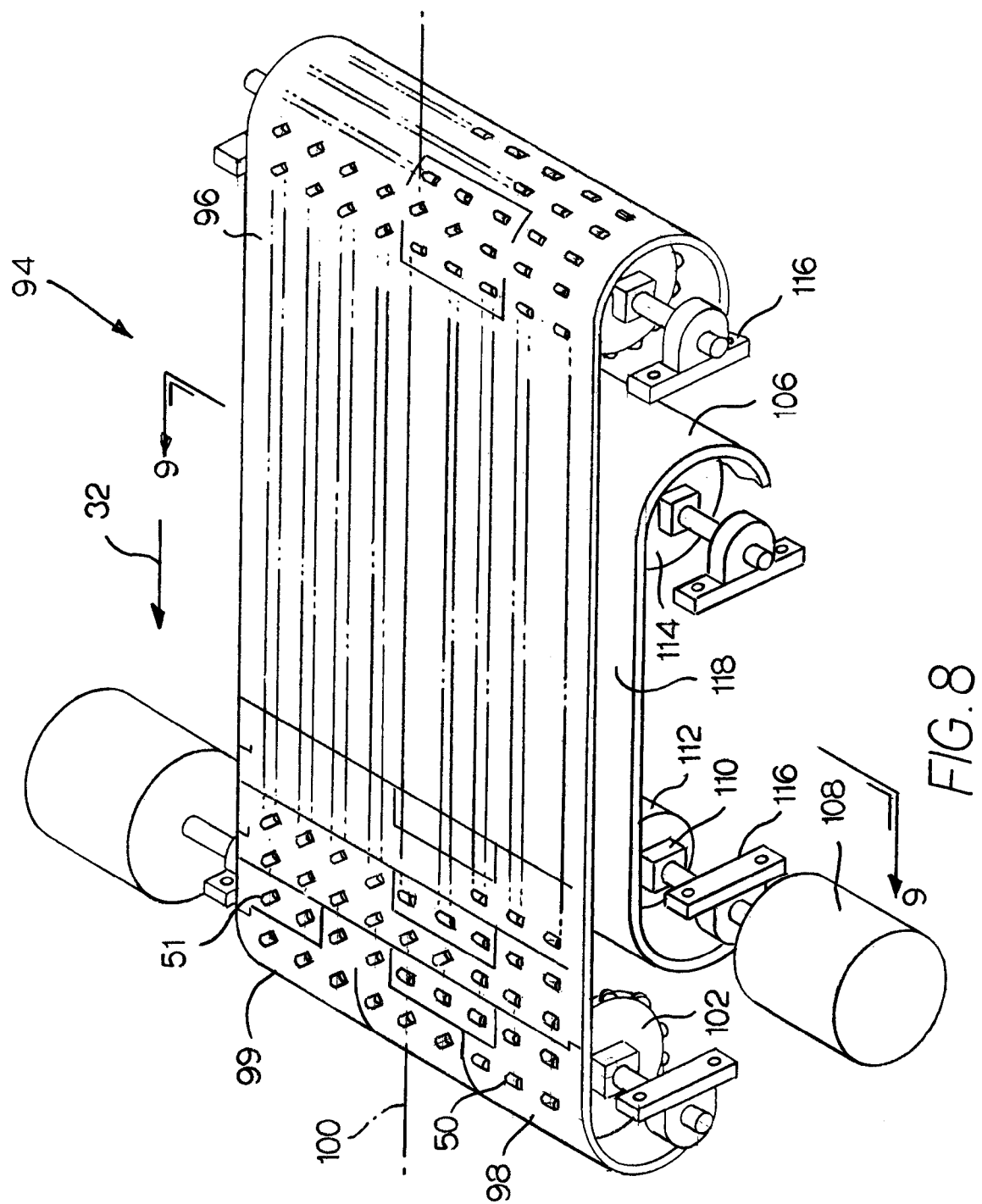
FIG. 8 is a pictorial view of another version of a conveyor embodying features of the invention including backward-rotating in-line rollers.

Another version of a conveyor for rotating and translating articles according to the invention is shown in FIGS. 8 and 9. The conveyor 94 includes a conveyor belt 96 having in-line rollers 50 in a first longitudinal lane, or region 98, and oblique rollers 51 in a laterally offset second lane, or region 99. As shown, the two regions, as in the conveyor of FIG. 1, lie generally on opposite sides of the centerline 100 of the conveyor belt. A drive 102 for the conveyor belt includes sprockets, a drive shaft, bearing blocks, and a drive motor. The drive advances the belt in the conveying direction 32. Underlying the oblique rollers 51 in the second region 99 is a stationary, flat bearing surface formed on a wearsheet 104. (Wearstrips or longitudinal support rollers could alternatively be used instead of the wearsheet.) Underlying and contacting the in-line rollers 50 in the first region is a belt 106, such as a flat fabric or rubber belt or a modular plastic conveyor belt with a high-friction or other outer surface that engages well with the in-line rollers. The flat belt shown in FIGS. 8 and 9 is driven by a motor 108 coupled to the shaft 110 of a friction roller 112. The belt 106 is trained between the drive roller 112 and a tensioned idle roller 114. The ends of the shafts of both rollers are supported in bearing blocks 116. The speed of the flat belt 106 in the conveying direction affects the velocity of the in-line rollers. If, for example, the speed of the flat belt is the same as the speed of the conveyor belt 96, there is no relative motion between the bearing surface formed by the outer surface of the flat belt and the in-line rollers 50. Consequently, the tangential velocity of the in-line rollers is zero in that case. If the speed of the flat belt 106 is less than the speed of the conveyor belt 96, the differential belt speed causes the rollers to rotate in the conveying direction proportionate to the difference in the belt speeds. If the speed of the flat belt exceeds the speed of the conveyor belt, the in-line rollers rotate opposite to the conveying direction, as indicated by the speed vector diagram of FIG. 10. Thus, the flat belt engaging the rollers constitutes roller control means in this example.

Figure 11A:
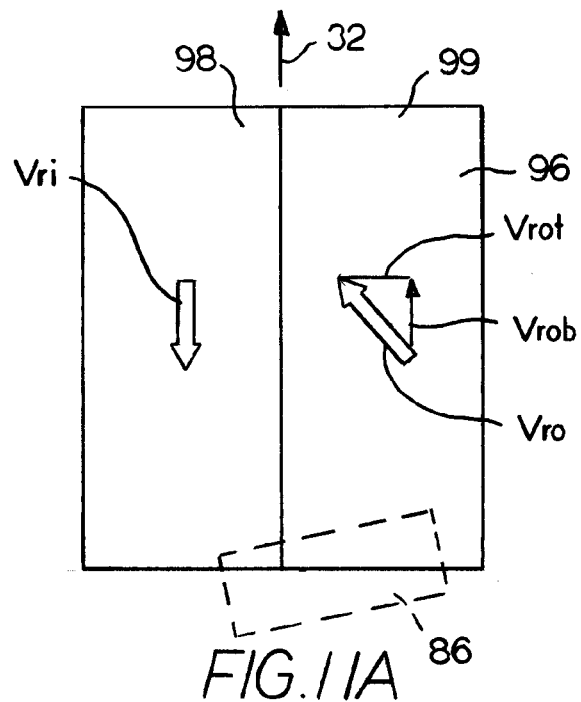
FIGS. 11A-11D are top plan diagrams illustrating the rotation and translation of articles conveyed by the conveyor of FIG. 8.
Figure 11B:
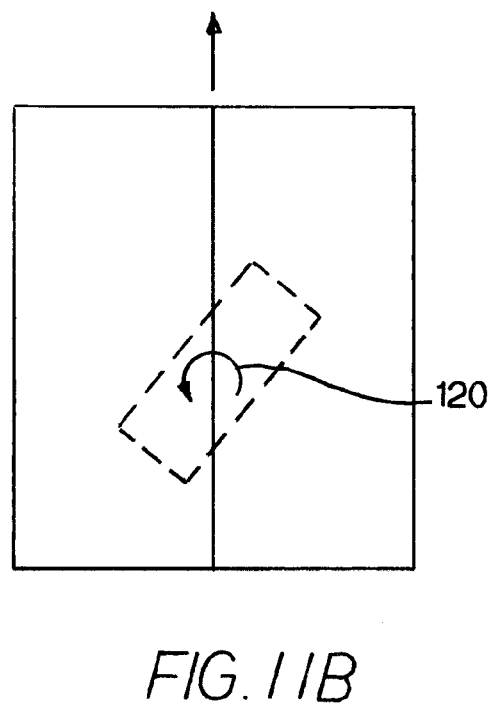
Figure 11C:
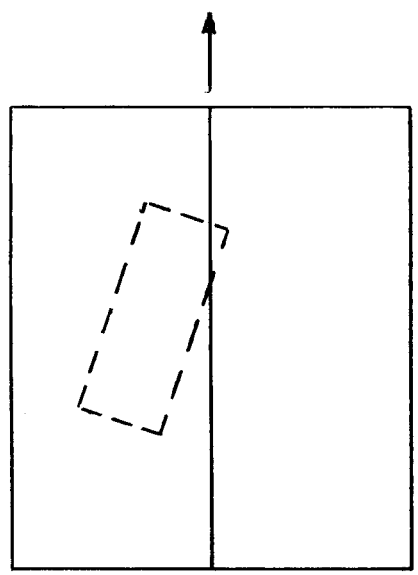
Figure 11D:
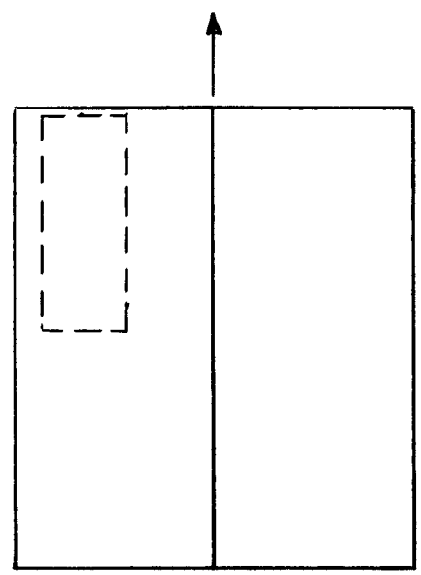

The operation of the conveyor of FIG. 8 is illustrated in FIGS. 11A-11D. An article 86 enters the upstream end of the conveyor belt 96 advancing in the conveying direction 32. With the roller-engaging flat belt running at a higher speed, in-line rollers in the first region 98 are rotating opposite to the conveying direction as indicated by arrow $v_{ri}$. The oblique rollers in the second region 99 roll along stationary wearstrips with a tangential speed $v_{ro}$ having a component $v_{rob}$ in the conveying direction. The two oppositely directed roller velocity components cause the article to rotate in the direction of arrow 120 in FIG. 11B as the conveyor belt advances. The transverse component of velocity $v_{rot}$ of the oblique rollers in the second region simultaneously pushes the article laterally across the conveying surface as shown in FIG. 11C. The belt parameters can be adjusted to the characteristics of the conveyed articles for a 90° rotation and a lateral translation of conveyed articles to its destination at the side of the belt, as in FIG. 11D.

Figure 12:
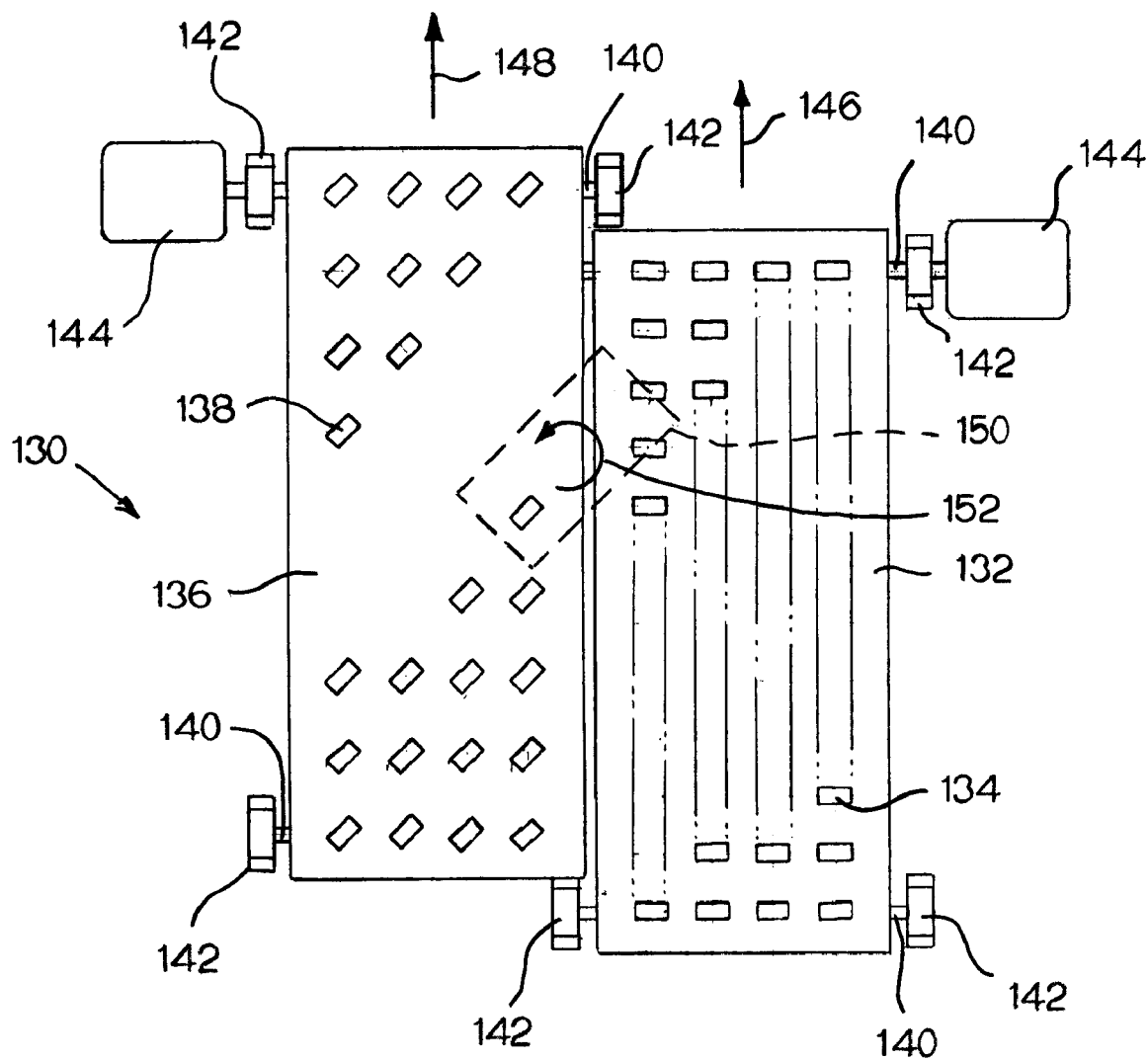
FIG. 12 is a top plan view of another version of a conveyor embodying features of the invention including side-by-side in-line and oblique roller-top conveyor belts advancing at different speeds.

Similar results can be achieved with the conveyor shown in FIG. 12. The conveyor 130 is characterized by a pair of side-by-side conveyor belts. The first belt 132 has in-line rollers 134, and the second belt 136 has oblique rollers 138. The rollers in each belt protrude through the belts' thicknesses into contact with bearing surfaces supporting the belts along their carryways. Conveyed articles ride atop the rollers, which rotate on the bearing surfaces as the belts advance. Each belt is trained between independent drive and idle components, including sprockets (not shown), shafts 140, bearing blocks 142, and drive motors 144. If the speed 146 of the in-line-roller belt 132 is greater than the speed 148 of the oblique-roller belt 136, the speed in the conveying direction of the in-line rollers exceeds that of the oblique rollers and their action on an article 150 spanning the gap between the two belts rotates the article counterclockwise, as indicated by arrow 152. The oblique rollers simultaneously push the articles toward the oblique-roller-belt side of the conveyor. Thus, the orientation of a conveyed article can be controlled by adjusting the relative speeds of the two belts with the individual drives, together constitute roller control means.

Figure 13:
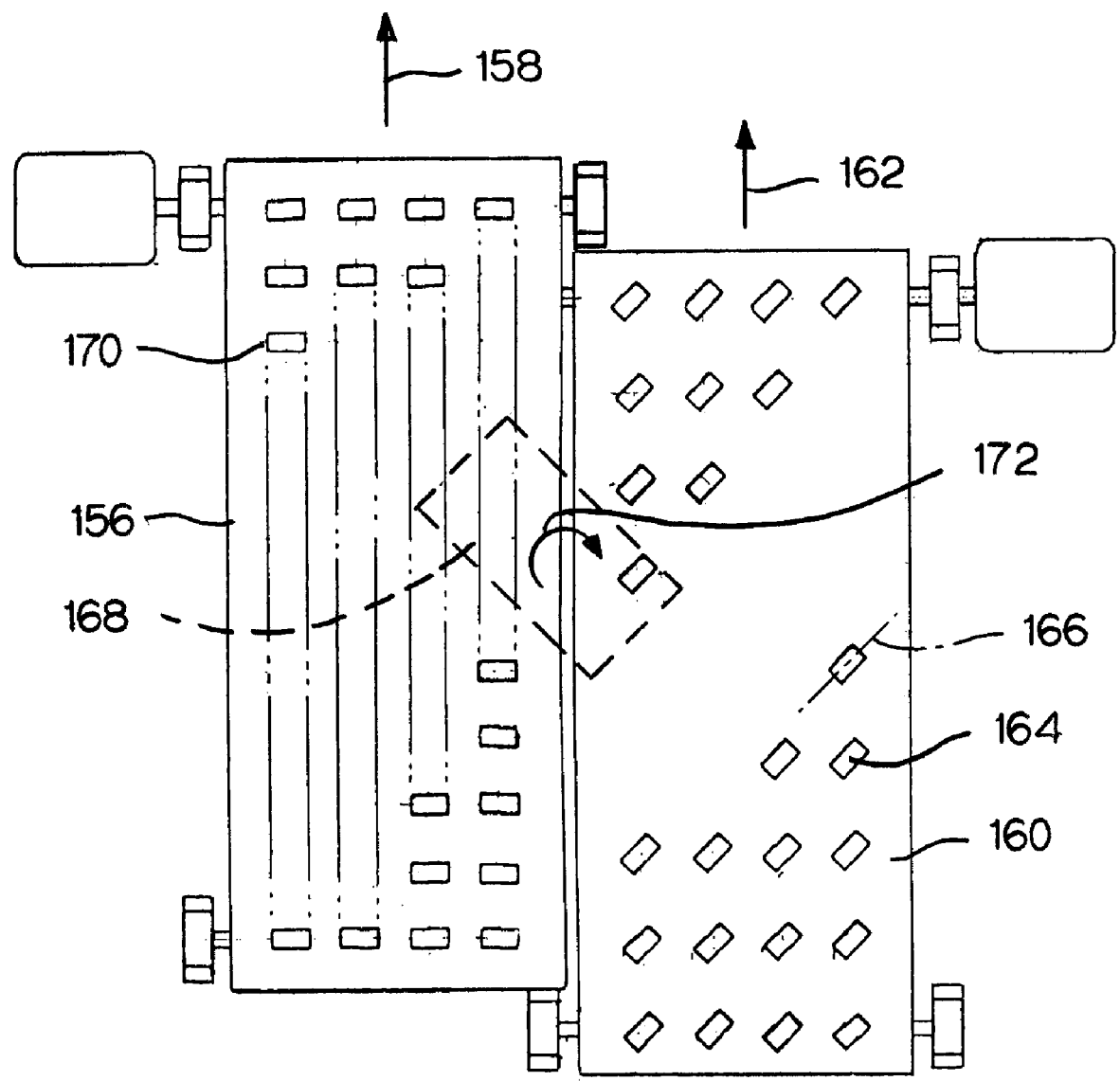
FIG. 13 is a top plan view of yet another version of a conveyor embodying features of the invention including side-by-side in-line and oblique roller conveyor belts in which the in-line roller belt advances at a higher speed than the oblique roller belt.

In the conveyor shown in FIG. 13, an in-line roller belt 156 advances along the carryway in the conveying direction at a first speed 158. An adjacent oblique roller belt 160 also advances in the conveying direction, but at a slower speed 162. The rollers 164 in the oblique roller belt rotate on oblique axes 166 arranged to push articles 168 atop the rollers toward the in-line roller belt as the belts advance. Both conveyor belts ride on underlying bearing surfaces in the carryway that the rollers engage in rolling contact. The higher speed of the in-line belt causes its rollers 170 to rotate at a higher speed (e.g., three times the speed) in the conveying direction to rotate conveyed articles in a clockwise direction 172.

Although the invention has been described in detail with respect to a few preferred versions, other versions are possible. For example, a speed-controlled flat belt could be used as a bearing surface in the conveyor of FIG. 12 to help control the relative rotational speeds of the rollers. Likewise, an individual feature shown in one of the versions may also be used effectively with one of the other versions to meet a specific conveying requirement or article geometry or other physical characteristics. So, the scope of the invention is not meant to be limited to the specific versions described in detail.

What is claimed is:

1. A conveyor comprising:
  a carryway extending longitudinally in a conveying direction from an upstream end to a downstream end and laterally in width from a first side edge to a second side edge;
  at least one conveyor belt advancing along the carryway in the conveying direction and forming an outer conveying surface, wherein the conveyor belt includes rollers extending upward through the thickness of the conveyor belt into supporting contact with conveyed articles along the carryway;
  wherein the outer conveying surface is divided into at least two regions including a first region nearer the first side edge and a laterally offset second region nearer the second side edge and wherein the rollers in the first region are oriented to rotate in a first direction and the rollers in the second region are oriented to rotate in a second direction;
  roller control means for causing the rollers in the first region to rotate at a first velocity and the rollers in the second region at a second velocity, wherein the component of the first velocity in the conveying direction is different from the component of the second velocity in the conveying direction.

2. A conveyor as in claim 1 wherein the first region extends laterally to the first side edge and the second region extends laterally to the second side edge.

3. A conveyor as in claim 1 wherein the first region and the second region are formed by laterally adjacent first and second conveyor belts.

4. A conveyor as in claim 3 wherein the roller control means comprises:
   bearing surfaces along the carryway;
   a first drive advancing the first conveyor belt in the conveying direction at a first speed; a second drive advancing the second conveyor belt in the conveying direction at a second speed lower than the first speed;
   wherein the rollers in the first and second regions extend through the thickness of the conveyor belt to rotate on the bearing surfaces as the conveyor belt advances in the conveying direction.

5. A conveyor as in claim 1 wherein the outer conveying surface includes a third region between the second region and the second side edge of the conveyor belt wherein the rollers in the third region are free to rotate in a direction directing conveyed articles toward the second side edge.

6. A conveyor as in claim 5 wherein the rollers in the third region are free to rotate on axes aligned in the conveying direction.

7. A conveyor as in claim 1 wherein the first direction is the conveying direction and the second direction is oblique to the conveying direction.

8. A conveyor as in claim 1 wherein the roller control means comprises bearing surfaces along the carryway and wherein the rollers in the first and second regions extend through the thickness of the belt to rotate on the bearing surfaces as the belt advances in the conveying direction.

9. A conveyor as in claim 8 wherein the bearing surfaces are formed as the outer surface of a belt underlying the conveyor belt along the carryway, contacting the rollers in the first region, and advancing in the conveying direction.

10. A conveyor as in claim 9 wherein the belt underlying the conveyor belt advances at a speed greater than the speed of the conveyor belt.

11. A conveyor as in claim 8 wherein the roller control means further comprises treads on the peripheries of the rollers in the first region made of a high-friction material to reduce the slip between the rollers in the first region and the bearing surfaces to less than the slip between the rollers in the second region and the bearing surfaces.

12. A conveyor as in claim 8 wherein the roller control means causes the rollers in the first region to rotate with the component of the second velocity opposite to the conveying direction.

13. A conveyor comprising:
   a carryway extending longitudinally in a conveying direction from an upstream end to a downstream end and laterally in width from a first side edge to a second side edge;
   at least one conveyor belt advancing along the carryway in the conveying direction and forming an outer conveying surface divided into a first region and a laterally offset second region;
   first rollers in the first region extending through the thickness of the conveyor belt and rotatable on parallel first axes generally perpendicular to the conveying direction;
   second rollers in the second region extending through the thickness of the conveyor belt and rotatable on parallel second axes oblique to the first axes;
   roller-engagement surfaces underlying the conveyor belt along the carryway in contact with the first and second rollers to cause the first and second rollers to rotate as the conveyor belt advances in the conveying direction;
   wherein the engagement of the roller-engagement surfaces with the first and second rollers causes the first rollers to rotate with a velocity component in the conveying direction different from the velocity component in the conveying direction of the second rollers as the at least one conveyor belt advances along the carryway.

14. A conveyor as in claim 13 wherein the roller-engagement surfaces underlying and contacting the first rollers advance in the conveying direction.

15. A conveyor as in claim 13 wherein the roller-engagement surfaces underlying and contacting the first rollers advance in the conveying direction at a speed greater than the speed of the at least one conveyor belt to rotate the first rollers to push articles conveyed atop the first rollers opposite to the conveying direction.

16. A conveyor as in claim 14 wherein the roller-engagement surfaces advancing in the conveying direction are formed by the outer surface of one or more endless belt loops.

17. A conveyor as in claim 14 wherein the outer conveying surface includes a third region between the second region and the second side edge of the belt wherein the rollers in the third region are out of contact with the bearing surfaces and free to rotate in a direction directing conveyed articles toward the second side edge.

18. A conveyor as in claim 13 wherein the first region is defined by an in-line roller belt advancing along the carryway in the conveying direction at a first speed and the second region is defined by an oblique roller belt advancing in the conveying direction at a second speed slower than the first speed and wherein the oblique roller belt pushes conveyed articles toward the in-line roller belt.

19. A method for rotating an article conveyed atop a belt conveyor comprising:
   advancing at least one conveyor belt in a conveying direction, the conveyor belt having an upper conveying surface divided into laterally offset first and second regions with first rollers in the first region extending through the thickness of the conveyor belt and arranged to rotate in a first direction and second rollers in the second region extending through the thickness of the conveyor belt and arranged to rotate in a second direction;
   rotating the first rollers in the first direction with a first velocity component in the conveying direction and the second rollers in the second direction with a different second velocity component in the conveying direction to cause an article simultaneously in the first and second regions atop first and second rollers to rotate on the upper conveying surface.

* * * * *